United States Patent [19]
Baer

[11] Patent Number: 5,627,849
[45] Date of Patent: May 6, 1997

[54] LOW AMPLITUDE NOISE, INTRACAVITY DOUBLED LASER

[76] Inventor: Thomas M. Baer, 537 Drucilla Dr., Mountain View, Calif. 94040

[21] Appl. No.: 609,186

[22] Filed: Mar. 1, 1996

[51] Int. Cl.$^6$ ......................................... H01S 3/13
[52] U.S. Cl. .................. 372/31; 372/92; 372/22; 372/93; 372/19
[58] Field of Search ......................... 372/98, 99, 92, 372/93, 22, 19, 31, 29, 21

[56] References Cited

U.S. PATENT DOCUMENTS

| | | | |
|---|---|---|---|
| 5,257,274 | 10/1993 | Barrett et al. | 372/21 |
| 5,263,038 | 11/1993 | Lukas et al. | 372/31 |
| 5,412,676 | 5/1995 | Schnier et al. | 372/31 |

Primary Examiner—Leon Scott, Jr.
Attorney, Agent, or Firm—D'Alessandro & Ritchie

[57] ABSTRACT

An amplitude-stable intracavity doubled laser comprises a pair of end mirrors defining a laser cavity having a length L. A laser medium having a gain region substantially smaller than the length L of the laser cavity is positioned within the laser cavity. A doubling crystal having a nonlinear conversion region substantially smaller than, the length L of the laser cavity is positioned within the laser cavity. A pump source is oriented to supply excitation energy to the laser medium. The laser medium and the doubling crystal located at positions within the laser cavity so as to cause the laser to lase in fewer than ten longitudinal modes and to output visible light with an amplitude noise of less than about 3% RMS on visible output from the laser.

19 Claims, 7 Drawing Sheets

LOW AMPLITUDE NOISE, INTRACAVITY DOUBLED LASER

BACKGROUND OF THE INVENTION

1. Field of the Invention

This invention relates to intracavity doubled lasers and more particularly to intracavity doubled lasers that are amplitude stable.

2. The Prior Art

There are many applications of visible lasers that require low amplitude noise, high efficiency, long operating life time, and compact size. Gas lasers can supply visible light with output power in the range of many watts with low amplitude noise but they are very inefficient, typically operating at electrical efficiencies of less then 0.1%. Gas lasers are also usually quite large and have lifetimes of only a few thousand hours, limited by the operating life of the plasma tube. There are many applications that would benefit from availability of a low-noise, efficient, long-lived solid-state laser capable of operating in the visible region of the optical spectrum.

One known prior-art method for obtaining visible emission from a solid-state laser is to insert a nonlinear doubling crystal into the cavity of an infrared laser. This method allows compact, and efficient laser designs with output powers from milliwatts to many watts in the blue, green, and red regions of the optical spectrum.

Previous designs of intracavity doubled solid-state lasers exhibit amplitude fluctuations in the visible output beam caused by nonlinear processes occurring in the intracavity nonlinear crystal. See, for example, T. Baer, J. Opt. Soc. Am. B, Vol. 3, No. 9, pp. 1175–1180 (1976). These amplitude fluctuations are often large in magnitude, often approaching 100% modulation, and have greatly limited the number of applications that could utilize these laser systems.

The amplitude fluctuations in prior-art intracavity doubled solid-state lasers have been attributed to a nonlinear coupling of the intensities of the different longitudinal modes due to the process of sum generation taking place in the nonlinear crystal. The sum generation process causes the intensities of the longitudinal modes to be interdependent since the intracavity losses experienced by each mode are determined by the intensities of the other modes. At steady state, the gain experienced by each mode is equal to the intracavity losses. However, if one mode increases in intensity, it can extinguish the other modes by increasing their losses, causing the other modes to drop below the lasing threshold. In this manner, sum generation destabilizes the laser system and results in chaotic pulsation of the laser output.

Several methods have been demonstrated that reduce these amplitude instabilities. One method, disclosed in U.S. Pat. Nos. 4,656,635 and 4,701,929 to Baer, is to run the laser in a single longitudinal mode by adding additional intracavity elements such as an etalon, by making the laser cavity very short (see U.S. Pat. No. 5,430,754 to Suzuki), or by designing the laser in a ring configuration so that only one mode oscillates (U.S. Pat. No. 5,052,815 to Nightengale et al.).

Another method utilized in the prior art is to add a quarter wave plate to the laser cavity which forces the laser to operate in orthogonally polarized modes as shown in Oka et al., Opt. Lett 13, 805 (1988). This reduces the sum generation process and stabilizes the laser output. This method has the disadvantage that it only works with specific nonlinear crystals (type two phase matching) and it requires additional intracavity elements.

All of these noise reduction techniques typically require additional intracavity elements that complicate the laser design and often lower the efficiency of the laser and reduce the output power. Additionally, these methods often increase the laser system sensitivity to changes in the laser resonator temperature.

Another method for reducing the amplitude noise utilizes a long laser cavity to introduce many longitudinal modes, typically 50 to 100. See U.S. Pat. No. 5,446,749 to Nighan et al. These many longitudinal modes provide an averaging effect which reduces the total a mount of laser noise. The individual modes are still unstable but the large number of modes reduces the magnitude of this instability. In some applications this residual instability of the individual modes may be unacceptable. This design in general requires a long laser resonator (greater than about 1 m in length) which is unsuitable for many applications where small designs are more desirable.

There is a need for a compact, efficient, intracavity doubled laser that can operate in several longitudinal modes with improved amplitude stability and that does not require any additional intracavity elements.

It is therefore an object of the present invention to provide an intracavity doubled laser that is amplitude stable and that runs in several longitudinal modes.

Yet another object of the present invention is to provide an intracavity doubled laser that is amplitude stable and is very efficient.

Another object of the present invention to provide an amplitude stable system that requires no additional optical elements.

A further object of the present invention is provide an amplitude stable laser system that is compact.

Another object of the present invention is to provide an intracavity doubled, multi-longitudinal mode laser that is amplitude stable and that produces blue, green, or red light.

BRIEF DESCRIPTION OF THE INVENTION

These and other objects of the invention are achieved in a compact, diode-pumped, solid-state laser by positioning a laser crystal and a non-linear doubling crystal in a laser resonator according to the teachings herein. The laser crystal is pumped by the output of an infrared diode laser. The pump light excites the laser medium resulting in infrared laser emission. The infrared emission is converted into the second harmonic of the lasing field by the nonlinear crystal. The laser crystal and nonlinear crystal are placed in specific locations within the laser cavity that reduce the magnitude of the sum generation process resulting in stable operation of the laser system.

Each longitudinal mode in the laser creates a standing wave pattern in the laser resonator and satisfies the condition that an integer number of wavelengths must be present in the laser resonator. These standing waves have specific locations in the laser resonator where the intensity is at a minimum (node) and a maximum (antinode). The locations of the nodes and antinodes are determined by the specific wavelengths of the individual oscillating longitudinal modes.

Locating a gain medium having a gain region substantially shorter than the laser resonator in a specific location within the laser resonator typically causes a small number (less than 10) of longitudinal modes to oscillate within the laser. These modes have different frequencies that are determined by the condition that an integer number of waves must be present in the laser resonator. The difference in frequency between the modes is the longitudinal mode spacing, c/2L, multiplied by a specific integer N, where c is the speed of light and L is the resonator length. The specific integer multiplier is determined by the location of the gain medium within the laser cavity.

For example, if the laser medium is located in the center of the laser resonator and if the length of the gain region is much smaller than the length of the laser resonator, then the laser will tend to oscillate in two adjacent longitudinal modes and the integer multiplier has the value N=1. The total number of nodes in the laser resonator for these two modes will differ by one. For this geometry, at the center of the cavity, the antinode of one mode is lined up with a node of the other mode. Thus, where one mode has a maximum intensity the other is at a minimum. This pair of modes efficiently extracts energy from the active medium. These modes will typically suppress other modes from operating by reducing the gain available to other modes so that they are below lasing threshold.

Sum generation in the intracavity nonlinear crystal is proportional to the product of the intensities of the two longitudinal modes. If the gain medium is located at the center of the laser resonator, and thus two adjacent cavity modes are oscillating, and the nonlinear crystal is also located at the center of the cavity, the product of the longitudinal mode intensities will be at a minimum in the nonlinear crystal since nodes of one mode are lined up with antinodes of the other mode. Reducing the nonlinear sum generation term in this fashion results in a substantial reduction in the amplitude noise of the laser. Thus placing the active medium and non linear crystal at the center of the laser cavity will result in more stable operation of the intracavity doubled laser system. Typically, a laser outputting visible light with low-amplitude noise will have less than 3% RMS noise measured in a bandwidth of 10 Hz to 10 MHz.

Other locations for the gain medium and nonlinear crystal in the laser resonator can be found that also result in more stable operation. In general, the active medium can be located at a distance D from one of the end mirrors of the laser cavity. The nonlinear crystal can be located in a symmetric position the same distance D from the other end mirror. For example, the active medium can be located at a distance D=L/4 from one end mirror and the nonlinear crystal located the same distance L/4 from the other end mirror. In this case, two modes will tend to oscillate separated by two longitudinal mode spacings (the integer multiplier N=2) and the nonlinear crystal and gain medium will both be located in positions where the nodes of one mode align with the antinodes of the other mode. Under this condition, the sum generation term will be reduced, resulting in more stable amplitude operation of the laser.

In some cases there will be multiple locations for the nonlinear crystal and gain medium where the laser will be more stable. These locations can be found by simply translating the gain medium and nonlinear crystal within the laser resonator and monitoring the laser amplitude noise to determine the appropriate location. Multiple gain media can be placed in the laser resonator provided that the gain media are located at symmetry points in the laser cavity.

For example, a gain region placed at a distance L/6 from an end mirror will encourage modes separated by 3 longitudinal mode spacings to oscillate (integer multiplier N=3). These modes will create 3 regions (D=L/6, D=L/2, D=5L/6) where the nodes of one mode line up with the antinodes of the other mode. If a second gain medium is located in either of these positions it will also be efficiently saturated by these two modes and other modes will have insufficient gain to oscillate. The nonlinear crystal can be located at the remaining location where the lasing longitudinal modes are out of phase and the sum generation term will be minimized, resulting in more stable laser operation.

In order for the sum generation term to be minimized, the length of the nonlinear crystal must be smaller than the length of the region in the laser resonator where the sum term is reduced. For example, in the case where the laser and active medium are located in the center of the laser cavity, the nonlinear crystal length should not exceed roughly ⅓ the length of the laser resonator since this is the length of the region where the nodes and antinodes of the lasing modes are out of phase.

DETAILED DESCRIPTION OF THE DRAWINGS

DETAILED DESCRIPTION OF THE PREFERRED EMBODIMENT

Those of ordinary skill in the art will realize that the following description of the present invention is illustrative only and not in any way limiting. Other embodiments of the invention will readily suggest themselves to such skilled persons.

A preferred embodiment of the low noise, intracavity doubled laser of the present invention includes a laser gain medium and a doubling crystal positioned within the resonator cavity. The gain medium can be excited by a variety of pump sources: incandescent lamps, noble gas arc lamps, gas lasers, and laser diodes. In the preferred embodiment of the invention, the pump source is a laser diode.

The emission from the laser diode pump source is focused into the active medium to concentrate the excitation energy in a region in the active medium where this energy can be extracted by the desired lasing mode. This approach is called mode-matched pumping and is well known in the art.

The laser resonator is formed by two end mirrors: a high reflector and an output coupler for the frequency-doubled light. These mirrors are optically coated to be highly reflective at the lasing wavelength and highly transmissive at the second harmonic and pump wavelengths. The lasing mode reaches high intensity within the laser resonator. The nonlinear crystal, located within the laser resonator, converts the high intensity lasing mode to its second harmonic, resulting in visible output.

Figure 1:
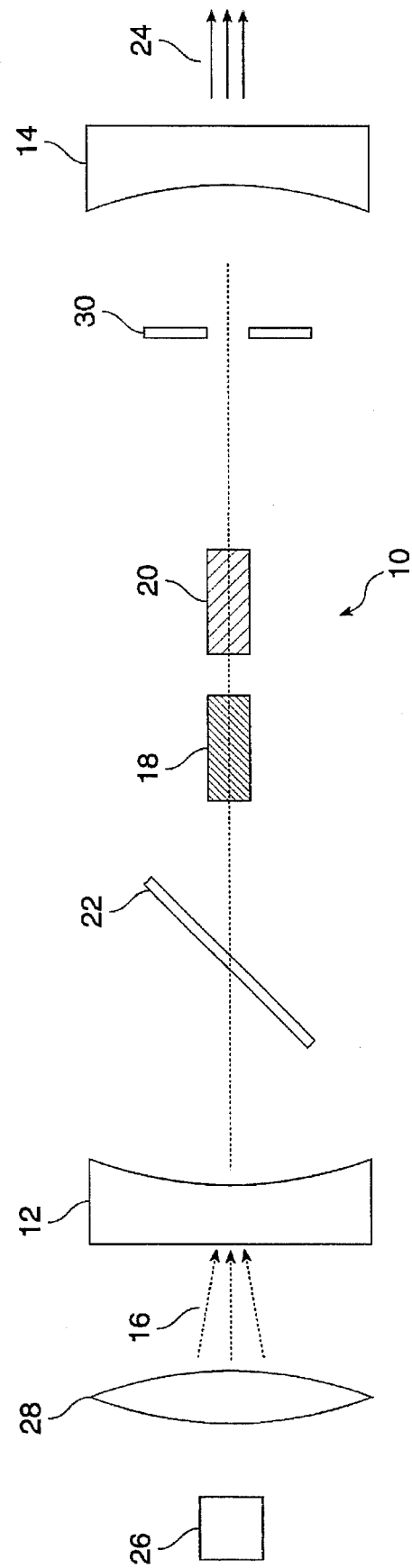
FIG. 1 is a schematic diagram of a linear laser resonator according to the present invention with the active medium and nonlinear crystal located in the center of the laser cavity.

Referring first to FIG. 1 a laser resonator 10 according to the present invention is bounded by end mirrors 12 and 14 which define the laser cavity with length L. End mirror 12 is optically coated to be highly reflective at the lasing wavelength (for Nd:YVO4 1064 nm) and highly transmissive at the pump wavelength (for Nd:YVO4 808 nm). End mirror 14 is optically coated to be highly reflective at the lasing wavelength but highly transmissive at the second harmonic wavelength (for Nd:YVO 4532 nm). The pump energy 16 is directed through the end mirror 12 and excites a volume within the active medium 18. The length of the active medium 18 is typically 1 mm to 5 mm. Suitable active media crystals include but are not limited to Nd:YVO4, Nd:YLF, Nd:YAG, Nd:GdVO4, etc. Preferred materials am Nd:YVO4, Nd:GdVO4, and Nd:YLF, since they am birefringent and the lasing modes have a well-defined polarization without the addition of intracavity polarizing elements. The length of the active medium is in part determined by the requirement that the majority of the pump excitation energy be absorbed in the laser crystal.

A nonlinear crystal 20 is also disposed in the laser resonator 10. The nonlinear crystal 20 should typically have a length of about 1 mm to about 5 mm. Suitable nonlinear crystal materials include but are not limited to: KTP, LBO, BBO, KNbO3, LiNBO3 etc. These crystals are fabricated, properly oriented in the laser cavity, and, if necessary heated to the appropriate temperature to be properly phase matched at the laser wavelength in order to provide efficient frequency doubling as is well known to those of ordinary skill in the art.

According to a first embodiment of the present invention, the active medium 18 and nonlinear crystal 20 are located approximately at the center of the laser resonator 10, about equidistant between each of the end mirrors 12 and 14. Both the active medium 18 and nonlinear crystal 20 have end surfaces that are optically coated to have low reflectivity at the lasing wavelength to minimize intracavity losses and can also be coated so as to have simultaneously low reflectivity at the second harmonic wavelength as well.

A polarization controlling element 22, for example a Brewster plate or polarizer, can be added optionally to the laser to control the polarization of the lasing mode. The orientation of the polarization controlling element 22 relative to the crystalline axes of the nonlinear crystal is adjusted so as to optimize the second harmonic output from the laser system as is well know to those of ordinary skill in the art. Alternatively, an active medium (such as Nd:YVO4 or Nd:YLF) that lases with a polarized output can be used and oriented to maximize the harmonic output from the nonlinear crystal 20.

The second harmonic output beam 24 exits the laser resonator 10 through the output coupler end mirror 14 which is coated to be highly transmissive at the second harmonic wavelength. The coatings specified above are appropriate for the active medium Nd:YVO4, however it should be appreciated that the optical elements can be chosen with suitable coatings for other active media.

The laser resonator 10 needs to be long enough to define a central region where the standing waves for the lasing modes are out of phase for a distance large enough to contain both the gain medium and nonlinear crystal. The length L of laser resonator 10 is therefore chosen to be at least approximately 3 times the total distance occupied by the nonlinear and gain medium crystals. The radii of curvature of the end mirrors 12 and 14 are chosen to adjust the diameter of the lasing mode so as to optimize the overlap between the pump volume in the laser medium 18 and the volume occupied by the laser mode, as is well known to those of ordinary skill in the art. Typical radii of curvature for end mirrors 12 and 14 are between about 10 mm and about 1000 mm, depending upon the length L of the laser resonator. A typical design for this type of laser according to the present invention is: active medium and nonlinear crystal lengths of approximately 5 mm, total cavity length of 60 mm, radii of curvature of end mirrors equal to approximately 50 mm, and pump excitation focused to a diameter of about 100 microns in the active medium.

A suitable pump source 26 for generating pump energy 16 is a fiber coupled laser diode or laser diode bar that delivers the pump energy to the active medium through a fiberoptic cable. A typical pump source of this type is SDL-2372-P3 or SDL-6480-P 5, manufactured by Spectra Diode Labs, San Jose, Calif. The wavelength of the laser diode source is chosen to match the absorption line of the gain medium. For Nd:YVO4, this wavelength is 808 nm. The diode laser output from the fiber can be focused into the active medium 18 using a lens 28 or pair of lens in a manner well known to those of ordinary skill in the art. Typical focal lengths for lens 28 are between about 5 mm and about 100 mm, and the lens is typically located adjacent to the high reflector mirror 12.

The size of the pump volume in the active medium can be adjusted to be the same size or slightly less than the volume of the lasing mode in the active medium by appropriate choice of focal length and position of lens 28. This will result in TEM00 operation of the laser. Alternatively, an optional fixed or adjustable aperture 30 can be added to the resonator to force the laser to operate in the TEM00 mode.

Figure 2:
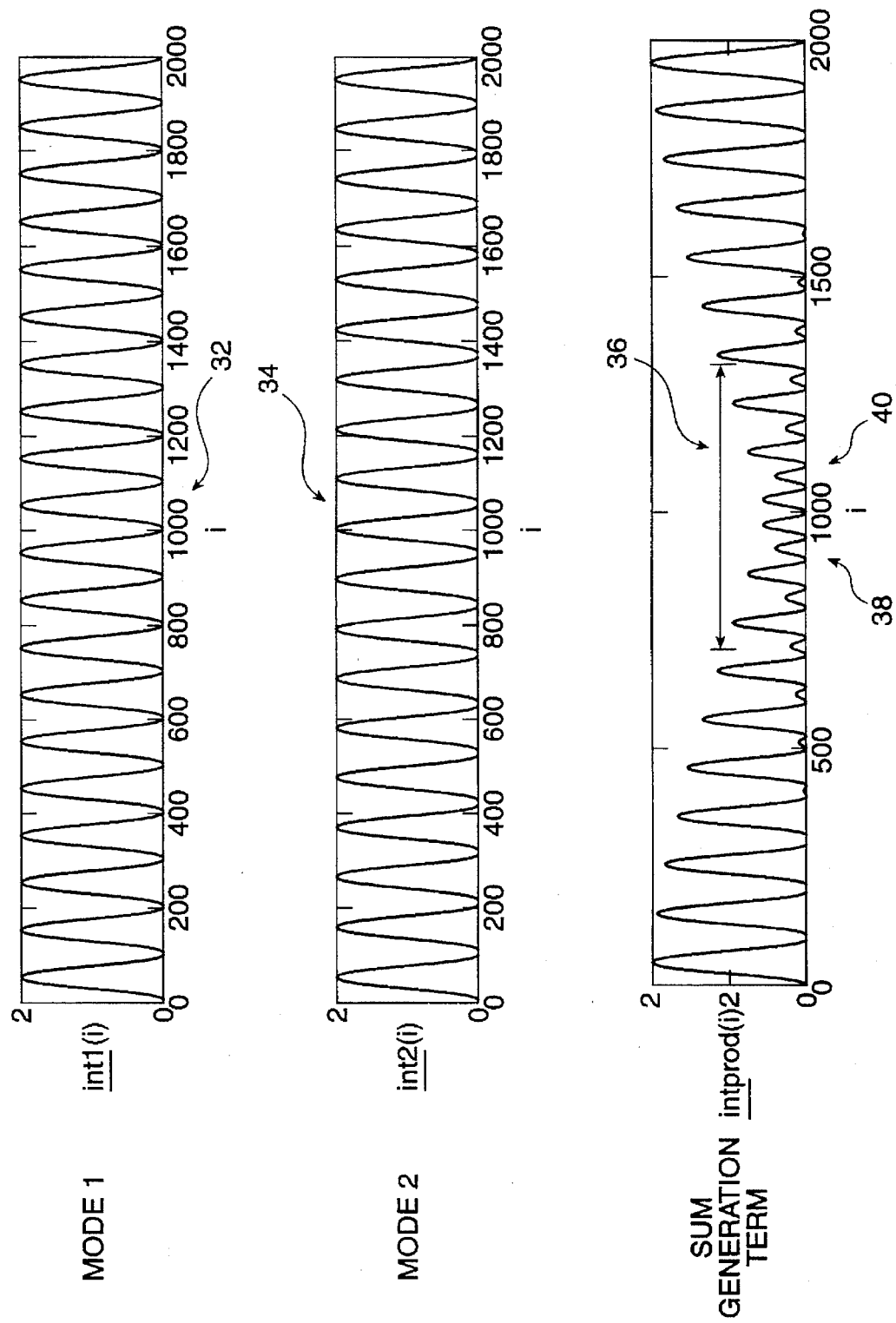
FIG. 2 is a series of graphs showing the locations of the nodes and antinodes of the modes in the laser cavity of FIG. 1 with two adjacent longitudinal modes oscillating and the corresponding product of the intensities of the two laser modes.

FIG. 2 is a series of graphs showing the locations of the nodes and antinodes of the modes in the laser cavity of FIG. 1. Two adjacent longitudinal modes are shown oscillating. A graph of the corresponding product of the intensities of the two laser modes is also shown. As can be seen from an examination of FIG. 2, at the center of the cavity, the nodes of mode one (reference numeral 32) overlap with the antinodes of mode two (reference numeral 34, defining a region 36 for locating the active medium 38, and nonlinear crystal 40 where the nonlinear sum generation term is reduced.

Figure 3:
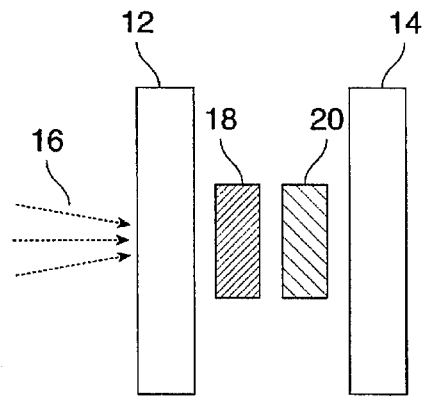
FIG. 3 is a schematic diagram of another linear laser resonator according to the present invention with the active medium and nonlinear crystal located in the center of the laser cavity.

A related embodiment of the present invention is illustrated schematically in FIG. 3. Reference numerals in FIG. 3 correspond to the reference numerals of corresponding structures in FIG. 1. The embodiment of FIG. 3 is a compact version of the laser of FIG. 1 and can be designed using an active medium 18 with a high absorption coefficient at the pump wavelength, such as highly doped Nd:YVO4 with a Nd concentration of about 3%, and a nonlinear doubling crystal 20 with a high nonlinear coefficient (high being defined as greater than the nonlinear coefficient of KDP), such as LiNbO3, LBO, or KTP. This allows the gain medium 18 and nonlinear crystal 20 to be each approximately 1 mm in length and allows the total resonant cavity length to be about 0.5 cm to about 2 cm.

As shown in FIG. 3, the end mirrors 12 and 14 for this embodiment of the present invention can be flat and the cavity is stabilized by the thermal lens created by the tightly-focused pump beam. Typical pump beam diameters for this type of cavity are between about 50 and about 200 microns. A suitable fiber-coupled diode source for this type of cavity is SDL-2362-P3 manufactured by Spectra Diode Labs of San Jose, Calif.

Figure 4:
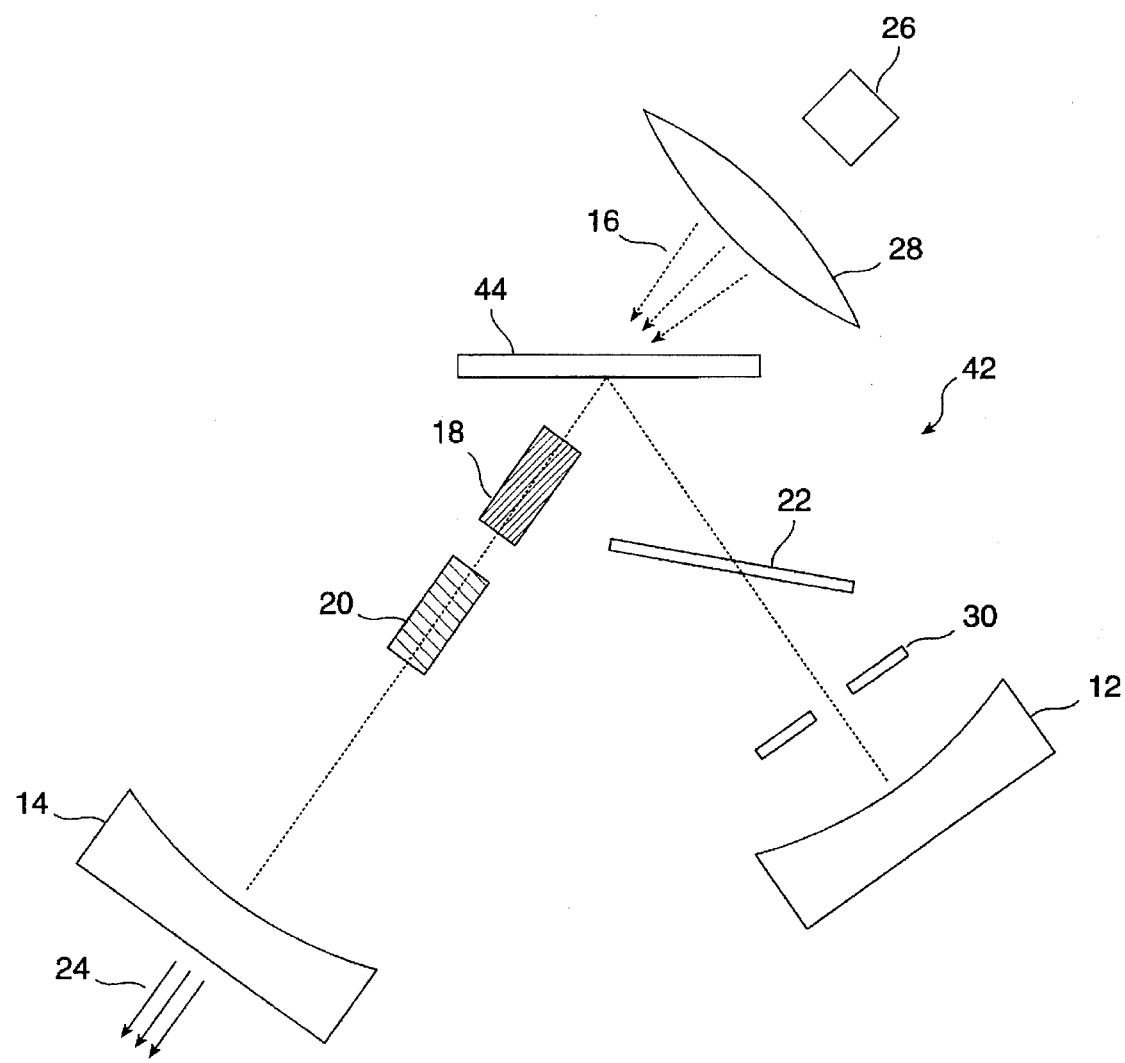
FIG. 4 is a folded version of the linear cavity illustrated in FIG. 1.

Referring now to FIG. 4, a schematic diagram of a folded embodiment of a laser according to the present invention is depicted. Elements in this embodiment of the invention will be given the same reference numerals as their counterparts in the embodiments of FIGS. 1 and 3. As in the embodiment of FIG. 1, laser resonator 42 of FIG. 4 is defined by a pair of end mirrors 12 and 14. In the embodiment illustrated in FIG. 4, the pump light 16 from pump source 26 is focused by lens 28 through a fold mirror 44 that is coated to be highly-transmissive at the pump wavelength and highly reflective at the lasing wavelength as will be appreciated by those of ordinary skill in the art. The fold mirror 44 can also be optically coated to act as a polarizer i.e., transmitting light polarized in the plane of the resonator and reflecting light polarized out of the plane of the resonator. If fold mirror 44 is polarized, it eliminates the need for a separate intracavity polarizer 22. The axes of the doubling crystal 20 are oriented with respect to the plane of the resonator so as to maximize the frequency-doubled output from the laser.

Figure 5:
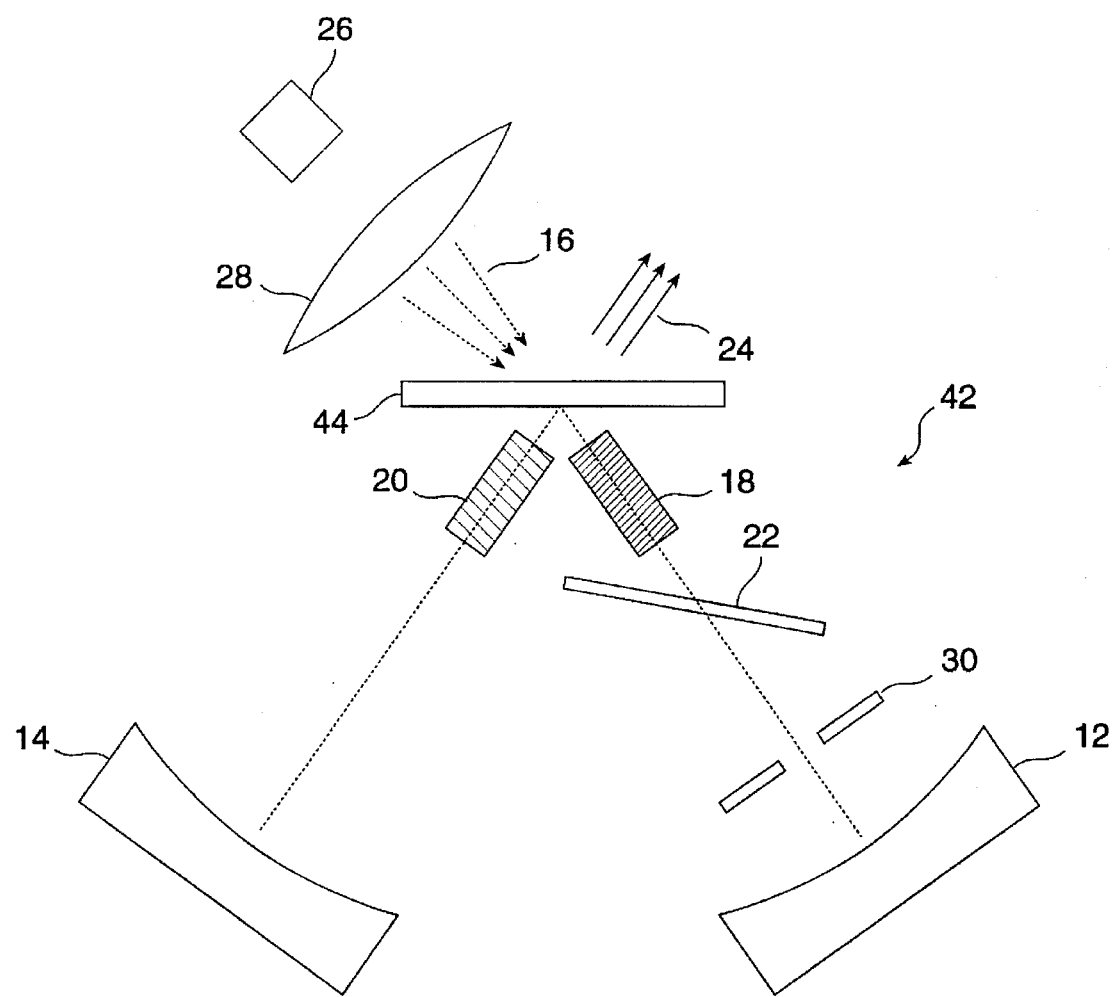
FIG. 5 is a diagram of a folded cavity with the frequency doubled laser beam exiting the fold mirror.

An alternative geometry for the embodiment of the present invention illustrated in FIG. 4 is depicted schematically in FIG. 5. In the embodiment illustrated in FIG. 5, the laser medium 18 and the nonlinear crystal 20 are placed in opposite arms of the laser cavity. In this design, the frequency-doubled output can be extracted through the fold mirror 44. This design has the advantage that the end mirror 14 can be coated to reflect the frequency-doubled light back through the doubling crystal and out the fold mirror 44, resulting in a substantial increase in frequency-doubled output power.

Figure 6:
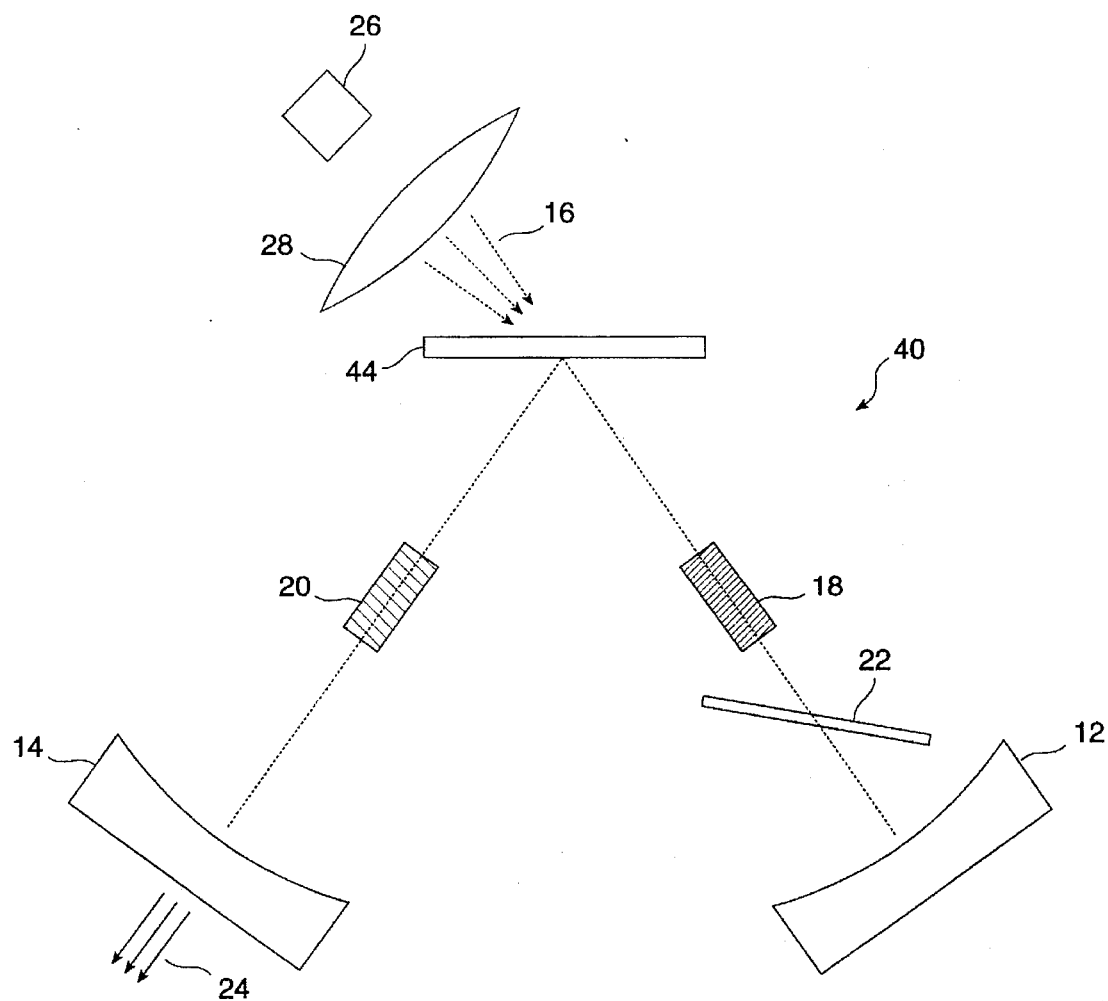
FIG. 6 is a schematic of a laser with the active medium located at a distance L/4 from the end mirror, where L is the length of the laser resonator.

Referring now to FIG. 6, a schematic diagram of a an embodiment of a laser resonator according to the present invention is shown wherein the laser medium 18 and the nonlinear crystal 20 are each located a distance d away from the end mirrors. In the particular illustration of this embodiment of the invention illustrated in FIG. 6, the distance d=L/4, where L is the total length of the laser resonator. Once again, the frequency-doubled light can be extracted from the output coupler 14 or through the fold mirror 44. Those of ordinary skill in the art will appreciate that other distances d can be chosen. It has been shown that a distance of d approximately equal to zero results in low amplitude noise output.

Figure 7:
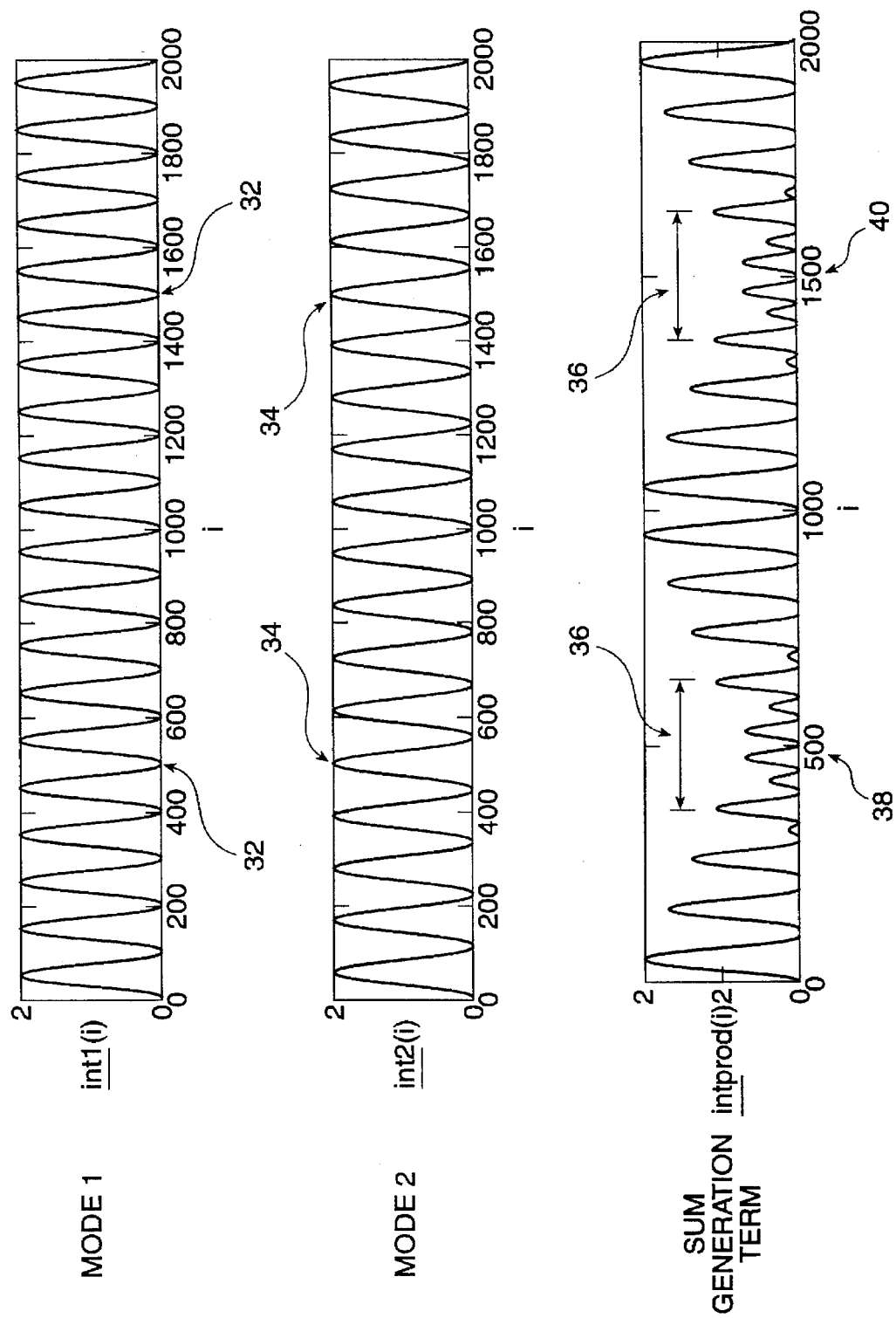
FIG. 7 is a series of graphs showing the locations of the nodes and antinodes of the laser illustrated in FIG. 6 with two modes separated by two longitudinal mode spacings and the corresponding product of the intensities of the two laser modes.

FIG. 7 is a set of graphs showing the mode intensity vs. position for the resonator of FIG. 6. For this type of design, the modes are out of phase at two positions 38 within the laser resonator, both located at a distance of L/4 from the end mirrors. The nonlinear crystal is located at either position 38 or 40 and the gain medium at the other location. Both locations have reduced sum frequency generation product terms.

An advantage of the laser design of the present invention illustrated in FIG. 6 is that the mode size in the nonlinear crystal can be different from the mode size in the active medium. Having a larger mode size in the active medium simplifies matching the pump volume to the lasing mode volume. Having a small diameter mode in the nonlinear crystal optimizes the conversion of the lasing mode to its second harmonic.

Figure 8:
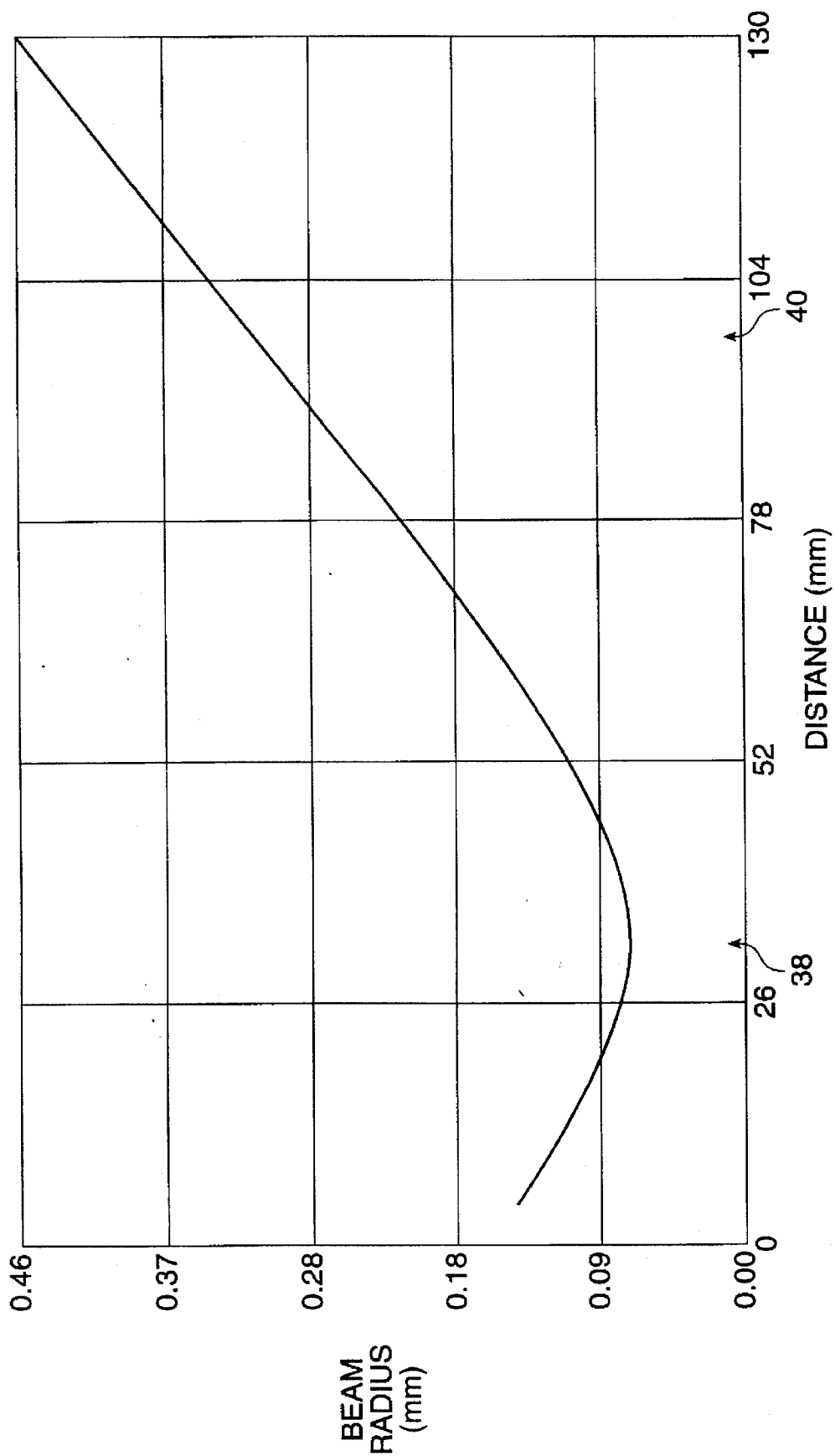
FIG. 8 is a graph of the mode radius vs. position within the laser resonator for a laser with two different size mode diameters for the nonlinear crystal and the gain medium.

FIG. 8 contains a plot of the radius of the lasing mode versus position in the laser resonator for a typical laser design. In this design, the radius of curvature of the output coupler 14 is 40 mm and the radius of curvature of the high-reflector 12 is 100 mm. The length of the laser resonator is approximately 130 mm.

As can be seen from FIG. 8, the mode radius at the nonlinear crystal position 38 is roughly 4 times smaller than at the gain medium position 40. The pump light 20 should be focused to a spot size approximately equal to or slightly less than the diameter of the laser mode in the gain medium, i.e., a diameter of about 400 μm, by appropriate choice of the focal length and position of lens 28 as is well known to those of ordinary skill in the art.

Multiple gain media can be added to the cavity provided they are placed in locations in the cavity at distances di from the end mirrors where the lasing modes are out of phase. For example, gain media can be located at positions where d1=L/6 and d2=L/2 distances from the high-reflector end mirror and the nonlinear crystal can be located at a distance d3=L/6 from the output coupler. In this design, the preferred lasing modes will be separated by three longitudinal mode spacings and there will be three locations where the modes are out of phase within the laser resonator. From the disclosure herein, those of ordinary skill in the art will be enabled to find similar positions for the multiple active media for preferred laser mode spacings of 4, 5, 6 etc., longitudinal mode spacings.

While embodiments and applications of this invention have been shown and described, it would be apparent to those skilled in the art that many more modifications than mentioned above are possible without departing from the inventive concepts herein. The invention, therefore, is not to be restricted except in the spirit of the appended claims.

What is claimed is:

1. An amplitude-stable intracavity doubled laser comprising:
   a pair of end mirrors defining a laser cavity having a length L;
   a laser medium positioned within said resonator cavity, said laser medium having a gain region substantially smaller than the length L of said laser cavity;
   a doubling crystal positioned within said laser cavity, said doubling crystal having a nonlinear conversion region substantially smaller than the length L of said laser cavity;
   a pump source oriented to supply excitation energy to said laser medium;
   said laser medium and said doubling crystal located at positions within said laser cavity so as to cause said laser to lase in fewer than ten longitudinal modes, to minimize mode coupling interactions between the modes, and to output visible light with an amplitude noise of less than about 3% RMS on visible output from said laser to thereby produce amplitude-stable operation.

2. The amplitude-stable intracavity doubled laser of claim 1 wherein said length L is less than 1 meter.

3. The amplitude-stable intracavity doubled laser of claim 1 wherein said length L is at least about 3 times the total distance occupied by said laser medium and said doubling crystal.

4. The amplitude-stable intracavity doubled laser of claim 1 wherein said end mirrors each have a radius chosen to set the diameter of the lasing mode such that an overlap between the pump volume in said laser medium and said volume occupied by the laser mode is maximized to thereby mode match the pump volume to the lasing mode in active medium.

5. The amplitude-stable intracavity doubled laser of claim 1 wherein said laser medium and said doubling crystal are located at about the center of said laser cavity.

6. The amplitude-stable intracavity doubled laser of claim 1 wherein said pump source is a laser diode pump source.

7. An amplitude-stable intracavity doubled laser comprising:

a pair of flat end mirrors defining a laser cavity having a length L between about 0.5 cm and about 2 cm;

a laser medium positioned within said laser cavity, said laser medium having a high absorption coefficient at a wavelength of excitation energy supplied to said laser, and a gain region substantially smaller than the length L of said laser cavity;

a doubling crystal positioned within said laser cavity, said doubling crystal having a nonlinear conversion region substantially smaller than the length L of said laser cavity, and a nonlinear coefficient sufficient to provide efficient frequency doubling;

a pump source oriented to supply excitation energy to said laser medium in a tightly-focused pump beam having a diameter between about 50 and about 200 microns;

said laser medium and said doubling crystal located at about the center said laser cavity to minimize mode coupling interactions between cavity modes and thereby produce amplitude-stable operation.

8. The laser of claim 7 wherein said laser medium comprises highly doped Nd:YVO4 with a Nd concentration of about 3%, and having a length of about 1 mm.

9. The laser of claim 7 wherein said doubling crystal is chosen from the group including LiNbO3, KNbO3, and KTP and has a length of about 1 mm.

10. The amplitude-stable intracavity doubled laser of claim 7 wherein said pump source is a laser diode pump source.

11. The amplitude-stable intracavity doubled laser of claim 7 wherein said doubling crystal has a nonlinear coefficient at least as high as that of KDP.

12. An amplitude-stable intracavity doubled laser comprising:

a pair of end mirrors defining a laser cavity having a length L;

a fold mirror located in the center of said laser cavity defining first and second arms of said laser cavity;

a laser medium positioned within said laser cavity, said laser medium having a gain region substantially smaller than the length L of said laser cavity;

a doubling crystal positioned within said laser cavity, said doubling crystal having a nonlinear conversion region substantially smaller than the length L of said laser cavity;

a pump source oriented to supply excitation energy to said laser medium through said fold mirror;

said laser medium and said doubling crystal located at positions within said laser cavity so as to cause said laser to lase in fewer than ten longitudinal modes to minimize mode coupling interactions between the modes, and to output visible light with an amplitude noise of less than about 3% RMS on visible output from said laser to thereby produce amplitude-stable operation.

13. The amplitude-stable intracavity doubled laser of claim 12 wherein said laser medium and said doubling crystal are located proximate to said fold mirror in the same one of said first and second arms of said laser cavity.

14. The amplitude-stable intracavity doubled laser of claim 12 wherein said laser medium and said doubling crystal are located proximate to said fold mirror in opposite ones one of said first and second arms of said laser cavity.

15. The amplitude-stable intracavity doubled laser of claim 12 wherein said laser medium and said doubling crystal are located in opposite ones of said first and second arms of said laser cavity at a distance of L/4 from said end mirrors.

16. The amplitude-stable intracavity doubled laser of claim 12 wherein said laser medium and said doubling crystal are located in opposite ones of said first and second arms of said laser cavity, said laser medium is located at a distance of L/2 from one of said end mirrors and said doubling crystal is located at a distance of L/6 from the other one of said end mirrors.

17. The amplitude-stable intracavity doubled laser of claim 12 wherein said laser medium and said doubling crystal are located in opposite ones of said first and second arms of said laser cavity, said laser medium is located at a distance of L/6 from one of said end mirrors and said doubling crystal is located at a distance of L/6 from the other one of said end mirrors.

18. The amplitude-stable intracavity doubled laser of claim 12 wherein said pump source is a laser diode pump source.

19. A method for operating an amplitude-stable intracavity doubled laser comprising the steps of:

providing a pair of end mirrors to define a laser cavity having a length L;

providing a laser medium within said resonator cavity, said laser medium having a gain region substantially smaller than the length L of said laser cavity;

providing a doubling crystal within said laser cavity, said doubling crystal having a nonlinear conversion region substantially smaller than the length L of said laser cavity;

positioning said laser medium and said doubling crystal within said laser cavity so as to cause said laser to lase with a minimum of amplitude noise; and supplying excitation energy to said laser medium from a pump source.

* * * * *

UNITED STATES PATENT AND TRADEMARK OFFICE
CERTIFICATE OF CORRECTION

PATENT NO. : 5,627,849
DATED : May 6, 1997
INVENTOR(S) : Thomas M. Baer

It is certified that error appears in the above-indentified patent and that said Letters Patent is hereby corrected as shown below:

In the Abstract, line 6: replace "than, the" with --than the--.

Sheet 5 of 7, in FIG. 6 the laser resonator was incorrectly labeled as 40. The laser resonator should be labeled as 42.

Column 2, line 13: replace "a mount" with --amount--.

Column 2, line 31: replace "invention to" with --invention is to--.

Column 2, line 34: replace "is provide" with --is to provide--.

Column 5, line 21: replace "Nd:YVO 4532" with --Nd:YVO4 532--.

Column 5, line 26: replace "am" with --are--.

Column 7, line 41: replace "of a an" with --of an--.

Claim 4, Column 9, line 4: replace "in active" with --in the active--.

Claim 7, Column 9, line 29: replace "center said" with --center of said--.

Claim 14, Column 10, line 18: replace "ones one of" with --ones of--.

Signed and Sealed this

Twenty-third Day of December, 1997

*Attest:*

BRUCE LEHMAN

*Attesting Officer*     *Commissioner of Patents and Trademarks*